United States Patent
Seiler (10) Patent No.: US 7,728,482 B2
(45) Date of Patent: Jun. 1, 2010

(54) BRUSHLESS DC MACHINE AND ITS RETURN RING PACKET, TOOTHED RIM PACKET, AND TOP PIECE, AND PRODUCTION METHOD THEREFOR

(75) Inventor: Hartmut Seiler, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 281 days.

(21) Appl. No.: 11/722,545

(22) PCT Filed: Jan. 23, 2006

(86) PCT No.: PCT/EP2006/050374

§ 371 (c)(1),
(2), (4) Date: Jun. 22, 2007

(87) PCT Pub. No.: WO2006/084787

PCT Pub. Date: Aug. 17, 2006

(65) Prior Publication Data
US 2008/0185935 A1    Aug. 7, 2008

(30) Foreign Application Priority Data
Feb. 10, 2005    (DE) .................. 10 2005 005 953

(51) Int. Cl.
*H02K 1/12* (2006.01)
(52) U.S. Cl. .................. 310/216.079; 310/216.081
(58) Field of Classification Search .......... 310/216.051, 310/216.053, 261.057–216.058, 216.069, 310/216.074, 216.079–216.087, 254.01
See application file for complete search history.

(56) References Cited

U.S. PATENT DOCUMENTS

| | | | | |
|---|---|---|---|---|
| 3,320,660 | A * | 5/1967 | Otto | 29/598 |
| 5,485,046 | A * | 1/1996 | Kaplan et al. | 310/166 |
| 5,570,503 | A * | 11/1996 | Stokes | 29/596 |
| 5,894,653 | A * | 4/1999 | Nakamura et al. | 29/596 |
| 6,483,221 | B1* | 11/2002 | Pawellek et al. | 310/216.064 |
| 2003/0102765 | A1* | 6/2003 | Knoll et al. | 310/218 |
| 2004/0124734 | A1* | 7/2004 | Liao | 310/218 |
| 2004/0227420 | A1* | 11/2004 | Lulic | 310/90 |
| 2005/0017594 | A1* | 1/2005 | Herp et al. | 310/218 |

FOREIGN PATENT DOCUMENTS

| | | |
|---|---|---|
| DE | 2 134 039 | 1/1973 |
| DE | 101 52 499 A1 | 5/2003 |
| DE | 102 29 333 A1 | 1/2004 |
| DE | 103 40 309 A1 | 7/2004 |
| WO | WO 03/065550 A1 | 8/2003 |

* cited by examiner

*Primary Examiner*—Tran N Nguyen
(74) *Attorney, Agent, or Firm*—Ronald E. Greigg (57) ABSTRACT

The invention relates to a brushless DC machine comprising a rotor and a stator that supports a winding assembly. The stator encompasses a toothed rim with tooth tips that extend radially outward as well as a return ring. The toothed rim and the return ring are embodied so as to engage into each other in a radial direction. The invention further relates to a return ring packet, a toothed rim packet, a top piece, and a method for producing a brushless DC machine.

19 Claims, 7 Drawing Sheets

BRUSHLESS DC MACHINE AND ITS RETURN RING PACKET, TOOTHED RIM PACKET, AND TOP PIECE, AND PRODUCTION METHOD THEREFOR

CROSS-REFERENCE TO RELATED APPLICATION

This application is a 35 USC 371 application of PCT/EP 2006/050374 filed on Jan. 23, 2006.

BACKGROUND OF THE INVENTION

1. Field of the Invention

The invention is directed to an improved brushless DC machine, and to a return ring packet, a toothed rim packet, and a top ice of the DC machine, as well as a method for producing the brushless DC machine.

2. Description of the Prior Art

Brushless DC machines (BLDC direct current machines), electrically commutated motors (EC motors), and switched reluctance motors (SR motors) are known. They have excellent electrical and mechanical properties, but have comparatively high production costs compared to DC machines with mechanical commutation (DC direct current machines). For this reason, EC DC machines have until now not found any significant use in low cost applications, for instance as in power tools or automotive applications. Since an EC DC machine for commutation fundamentally requires a semiconductor bridge circuit along with the associated control electronics, it has a strategic disadvantage compared to a DC direct current machine that does not require this expenditure.

In the prior art, for controlling DC machines (direction of rotation, rotary speed, torque), electronics have meanwhile come to be used increasingly often, so that the additional expense required for controlling an EC DC machine is becoming less and less significant.

However, the production methods for the known EC motors are expensive and complicated. The EC motor includes a stator constructed of stamped laminations. The stator serves to receive one or more stator windings, with which the performance specifications of the motor are essentially defined. For the windings, slots are for instance embodied in the stator. A rotor disposed on a motor shaft has a plurality of permanent magnets, which are disposed opposite the stator, separated by an air gap. The stator windings can be excited in succession in such a way that a rotary field that sets the rotor into rotation is generated.

The following winding methods are known in the prior art:

In a first method, a pull-in winding is produced; a winding for a stator is wound onto a core and is then pulled through gaps between teeth into slots of a stator. A disadvantage of this is that this method is relatively complicated and expensive and involves long cycle times. Furthermore, a wide tooth gap is necessary, which in turn has an adverse effect on magnetic properties of the motor thus produced.

In an alternative production method, a single-tooth or double-tooth winding is made. Here the stator is divided into two parts, a toothed rim and a return ring. So that the teeth of the toothed rim will not fall apart, they must remain joined together toward the rotor; that is, toward the rotor, the teeth are not separated by a gap. The connection of the teeth can also be provided toward the rotor only by a number of stamped laminations that suffices for the mechanical strength. A lamination packet of this kind, such as the stator of a conventional DC direct current machine, can be wound simply and quickly in one work step. As an example of a winding method, a single-tooth winding on a coil holder is known, in which after the winding is applied the holder is thrust from outside onto the teeth of the toothed rim. In the classical double-tooth winding method, the full number of windings is applied to one tooth, while the neighboring tooth remains free. However, precisely with short stator lengths, for instance of less 20 mm, the inoperative proportion of the wire of the winding heads is clearly measurable, so that the single-tooth winding method is to be preferred. In it, half of the numbers of windings are each applied to two adjacent teeth, with a contrary winding direction.

Following the winding process, the return ring packet, also made by stamping, is pressed by positive engagement onto the wound toothed rim packet. A disadvantage is that because of the pressing process, major mechanical stresses are created in the toothed rim packet that have to be absorbed by the tooth connections on the rotor side. These tooth connections can therefore not be removed again after the manufacture of the stator, which in turn has an adverse effect on the magnetic properties of the stator.

Moreover, because of the pressing operation, electrical connections among the individual stamped laminations of the packet are created at the contact point, leading to increased losses from eddy currents.

SUMMARY AND ADVANTAGES OF THE INVENTION

In the brushless DC machine of the invention, the toothed rim and the return ring are embodied as meshing with one another in the radial direction. Preferably, connecting means for making a connection of a contact face are provided, which are embodied between the tooth tips of the toothed rim and the return ring. As a result, initially no unfavorable mechanical stresses whatever occur. Moreover, the creation of eddy currents is avoided.

The DC machine of the invention includes a stator with a winding assembly and with a rotor; the stator includes a toothed rim, with radially outward-extending tooth tips, and a return ring.

In a favorable embodiment, the connecting means for making a connection between the tooth tips of the gear rim and the return ring have a deformable portion. In a further favorable feature, the gear rim and the return ring can be joined one into the other without force before a permanent connection is made by deforming the deformable portion.

A toothed rim packet according to the invention includes one toothed rim, without outward-pointing teeth and with radially extending tooth tips that form undercuts. The tooth tips expediently have an outer indentation.

A return ring packet of the invention includes at least one return ring, which is formed of an annular body having radially inward-pointing contact elements that widen in wedge-like fashion toward the inside, and the contact element form undercuts.

Preferably, contact faces corresponding with one another of the return ring and of the tooth tips are formed as the connecting means between the two packets. On one contact face, formed by connecting struts of the return ring, corresponding contact faces of the tooth tips of the gear rim can be embodied. It may be provided that contact elements, embodied as adapters, of wedgelike cross section are disposed between the connecting struts of the return ring. Because of the special shaping of the tooth tips and of the return ring, permanent connection can be produced.

In a method of the invention for producing a brushless DC machine, contact faces corresponding to one another are calked by means of thin-walled connecting struts of the return ring which are deformed such that wedgelike contact elements of the return ring that are located between the connecting struts are pulled against corresponding contact faces of the tooth tips. Before the calking, the return ring packet, after the tooth packet has been wound, can be thrust over the tooth packet or joined without the expenditure of force. Nor is an expenditure of force necessary, since between the gear rim packet and the return ring packet there is a small gap, a few tenths of a millimeter wide. Since the two packets upon joining are not pressed together with friction, no electrically conductive connections from material deformation and burr development at the joining point occur, which is advantageous.

After the joining, according to the invention a connection of the gear rim and return ring can be achieved by calking on the outside of the tooth tips. The thin-walled connecting struts can be pressed at least in some regions between the wedgelike contact elements of the return ring into an outer indentation of the tooth tips, and as a result the wedgelike contact elements are pulled practically automatically into engagement against the corresponding faces of the tooth tips. During the calking, the teeth on the rotor side, that is, on the inside diameter of the gear rim packet, can favorably be braced by a securing means, such as a mandrel.

Before the joining, the toothed rim packet and the return ring packet may be provided with an electrical insulation layer, such as a layer of paint, and as a result in the calking, a mechanically firm and electrically nonconductive connection is advantageously made between the tooth tips of the toothed rim packet and the return ring packet, and as a result the eddy current losses are reduced considerably.

Especially preferably, the connecting means may be embodied as clamping means, for instance in the form of steel wires or pins that are disposed in at least some regions in the outer indentations in the tooth tips. In the production method of the invention, the clamping means can be press-fitted in between the connecting struts of the return ring and the outer indentation in the tooth tips. On being pressed in, the thin-walled connecting struts are pressed outward and deformed elastically, causing the corresponding faces of the tooth tips and of the return ring to be pulled toward one another. Since the connecting struts are braced on the outside of the tooth tips via the press-fitted pins, advantageously no mechanical stresses in the connection of the teeth toward the rotor are created. These teeth can be favorably separated after joining without problems, either mechanically or electrochemically, for instance using an ECM process, and this disconnection contributes to improving the magnetic flux course.

It may also be provided that some of the tooth tips are calked to the corresponding connecting struts of the return ring packet, while some are wedged by means of the clamping means.

One top piece is advantageously disposed on each of the free ends of the stator. In the DC machine, one receiving opening for receiving a rotor bearing is provided in each top piece according to the invention. Because of the special embodiment of the top pieces, which makes it possible to dispose the rotor bearings inside the winding head, a substantial cost and structural space advantage is gained over the known EC motors, in which a separate housing, for instance of die-cast aluminum, is needed for receiving and supporting the rotor in order to insert the wound stator into it or to provide receptacles for supporting the rotor. By receiving the rotor bearings in the top pieces according to the invention, a very compact design of the DC machine is advantageously made possible, since the rotor bearings can be disposed directly on the rotor lamination packet on the shaft. This has the advantage that forces acting on the bearings are absorbed over the shortest distances, and imbalances can be intercepted in the best possible way. Since the top piece can be received with its pegs directly by the stator packet, the rotor shaft is optimally adjusted to the axis of symmetry of the stator packet. The deviation of the rotor shaft from its optimal position in the axis of symmetry of the stator is favorably markedly less, compared to supporting the rotor shaft in a housing shell in which the stator is received. The additional tolerance of the housing and stator must be compensated for by a larger air gap between the stator and rotor, which adversely affects the magnetic properties. For instance, the maximum attainable torque of the machine is reduced because of the enlargement of the air gap between the stator and the rotor.

Chambers for receiving and guiding the winding assembly are preferably provided in the top piece. Thus the top pieces simultaneously serve to both guide and receive the winding wires.

The top pieces are preferably formed of electrically and magnetically nonconductive material, for instance a high-grade thermoplastic such as polyphenylene sulfide, also known by the trademark Fortron. By means of this material, eddy current losses are advantageously avoided. Especially preferably, the top pieces have rounded edges, to prevent damage to the paint insulation of the winding wires.

The top pieces expediently separate the stator lamination packet from the winding. Preferably, the top pieces protrude at least partway into the slots located between the teeth of the toothed rim and serve to guide the winding wires in the slots from one slot to the next. For fixation and adjustment of the top pieces in the stator lamination packet, the top pieces may be provided with pegs, which are pressed into stamped holes in the outer tooth tips of the toothed rim packet. The pegs may be provided with notches, for better connection to the toothed rim packet. After being wound, the top pieces are expediently additionally held mechanically on the stator by the winding. To further improve the electrical installation and mechanical stability, the wound stator packet can be coated, for instance by immersion or dripping onto the winding head.

Instead of pegs of the top piece, sometimes mechanical connecting elements such as rivets, screws, and the like may be placed in the stamped holes in the tooth tips, in order to permanently fix the toothed rim packet. Further stamped holes for connecting elements may be provided on the outside of the wedgelike contact elements of the return lamination packet. The return lamination packet may be welded as usual, including in the outer region, to the contact elements for the sake of mechanical fixation.

BRIEF DESCRIPTION OF THE DRAWINGS

Further embodiments, aspects, and advantages of the invention will become apparent from exemplary embodiments of the invention described below, in conjunction with the drawings, in which.

DESCRIPTION OF THE PREFERRED EMBODIMENTS

Figure 1:
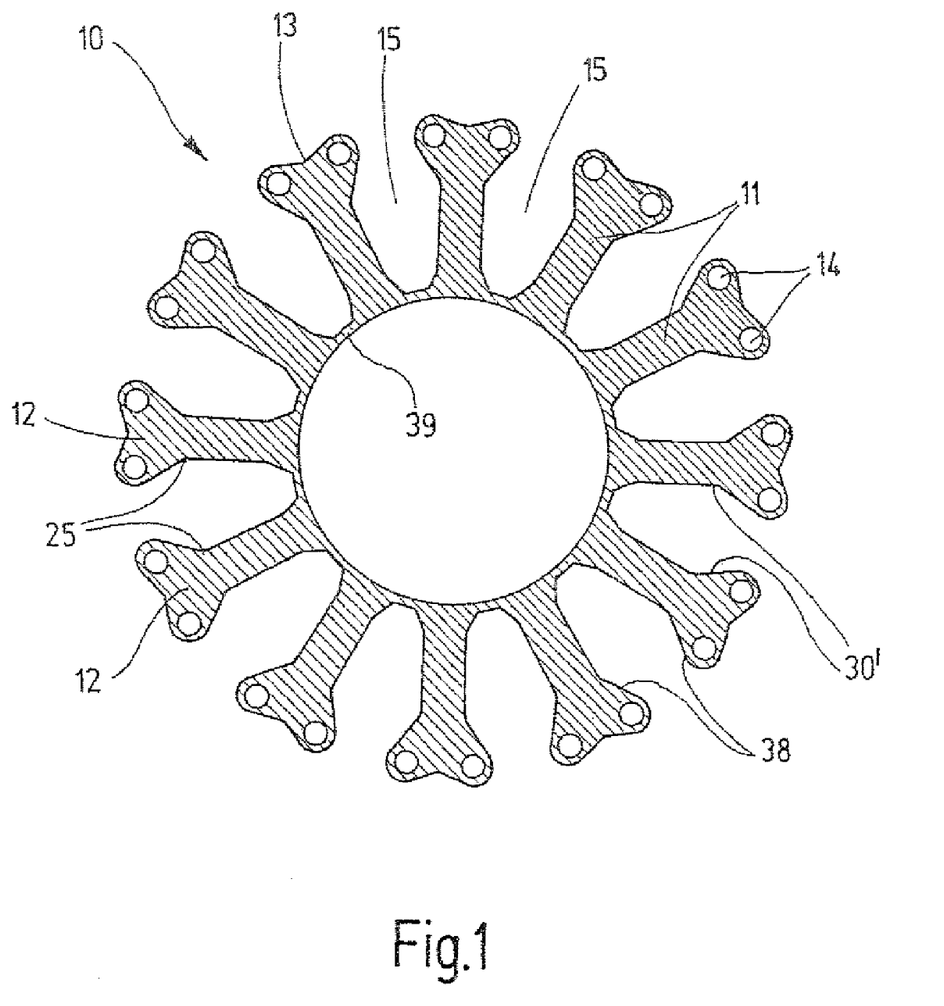
FIG. 1, is an end view of a toothed rim of a toothed rim packet of a DC machine.

FIG. 1 shows a top view of a toothed rim 10 of a DC machine, which toothed rim comprises stamped sheet metal and is part of a toothed rim packet 35 that together with a return ring packet 42 forms a stator; the stator has a winding assembly. The return ring packet 42, winding assembly, and stator are shown for instance in FIG. 4.

FIG. 1 shows a top view on a toothed rim 10 of a DC machine, which comprises stamped sheet metal and is part of a toothed rim packet 35 that together with a return ring packet 42 forms a stator; the stator has a winding assembly. The return ring packet 42, winding assembly, and stator are shown for instance in FIG. 4.

The toothed rim 10 includes outward-pointing teeth 11. Slots 15 for receiving a winding, not shown, are disposed between the individual teeth 11 of the toothed rim 10. The teeth 11 are connected on an inside by struts 39 in order to assure a stable mechanical unit for further processing. After being wound to the winding assembly and after being joined to a return ring and/or after calking or wedging of a return ring, the struts 39 can be severed. The teeth 11 extend in the radial direction and include tooth tips 12 that form undercuts 25; these tooth tips widen in wedgelike fashion toward the outside. Each of the tooth tips 12 is split in two on its free end, each with two symmetrical tablike bulges 38, with an outer indentation 13 in the middle. A stamped hole 14 is provided in each bulge 38, and the stamped holes 14 serve the purpose of fixation of a top or end piece 23, not shown in FIG. 1, and connection of the entire toothed rim packet 35. The individual toothed rim s 10 may be joined into a stack by stamped packeting; any stamped packeting impressions that may be present are not shown. Alternatively, the toothed rim s 10 may be joined to one another by means of such fastening elements as hollow rivets, notched pins, or screws, or can be baked into a stack after the toothed rim s have been coated with baked enamel. The connections by way of rivets have the advantage that short circuits between the individual laminations cannot be caused by stamping burrs, and thus eddy current losses are less or can be avoided. The same is true for producing the lamination stack using baked enamel.

For the sake of simplicity, only some of the same elements are provided with reference numerals in the drawings. Moreover, identical elements are identified by the same reference numerals in various views of the drawings.

Figures 2A, 2B:
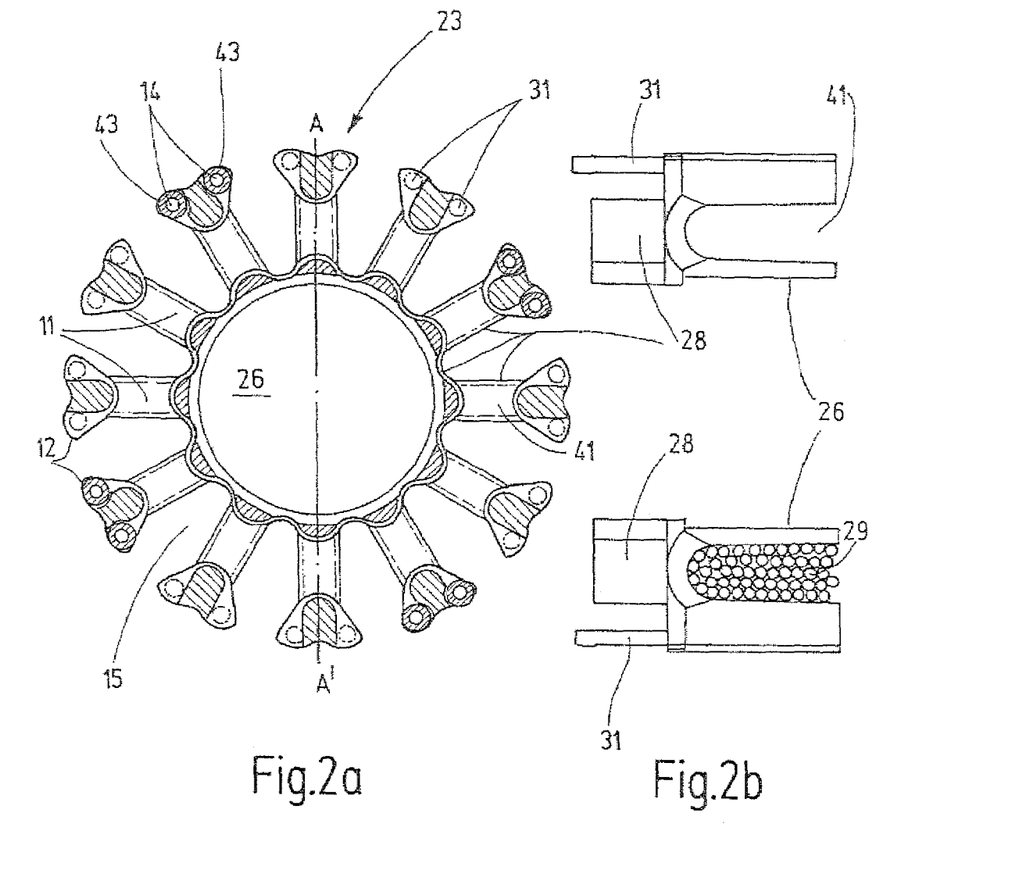
FIG. 2a, a top piece of a DC machine.
FIG. 2b, a section through a top piece of FIG. 2a taken along a line A-A'.

FIG. 2a shows a top or end view on a top piece 23; FIG. 2b shows a section through a top piece 23 along a line A-A'. Each top piece 23 is secured axially to the free ends of a gear rim packet 35. The construction of the top piece 23 corresponds substantially to the construction of the gear rim 10 in FIG. 1 with teeth 11, tooth tips 12 that have stamped holes 14, and slots 15. The top piece 23 serves to guide the winding; in edges of the slots 15, receiving devices 28 for guiding the winding assembly 29 are each provided inside the slots 15. Simultaneously, a top piece 23 serves to protect the winding and on the teeth 11, it has a face-end wire guide 41 for the winding assembly 29. As a result, the stator lamination packet is electrically separated and insulated from the winding assembly 29. The top piece 23 has a receiving opening 26 for receiving a rotor bearing, not shown. Via pegs 31, the top pieces 23 are connected to the gear rim packet, not shown; the pegs 31 protrude into the stamped holes 14 of the gear rim packet, or are pressed into it. In addition, the top pieces 23 may be secured to the gear rim packet with rivets 43, for instance. In that case, some of the pegs 31 are omitted and replaced with rivets 43, preferably embodied as hollow rivets.

Figure 3:
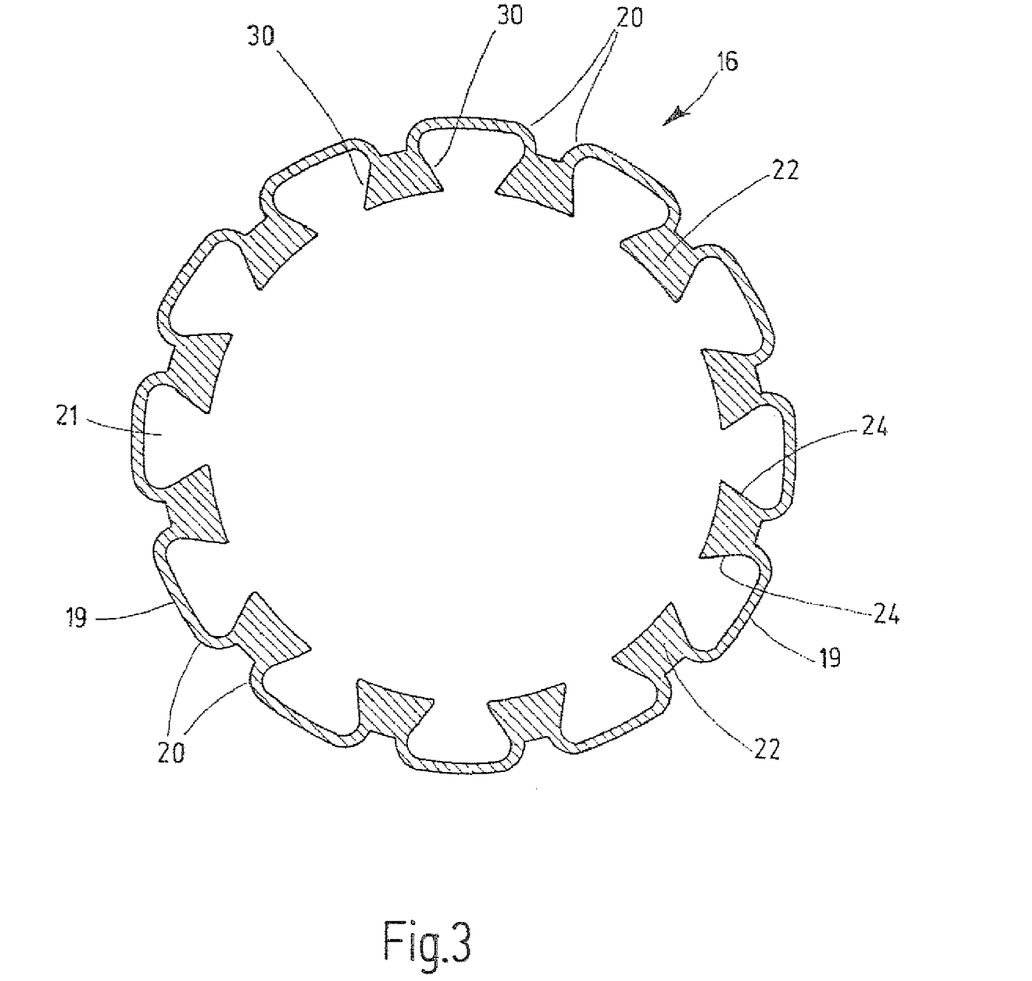
FIG. 3, is an end view of a return ring of a DC machine.

In FIG. 3, a top or end view of a stamped return ring 16 is shown. The return ring 16 is formed of an annular body with radially inward-pointing contact elements 22, and the contact elements 22 form undercuts 24. The contact elements 22 are embodied as adapters of wedgelike cross section. The contact elements 22 are joined by thin-walled connecting struts 19, which correspond to the tooth tips of the toothed rim. In the finished DC machine, the magnetic flux flows predominantly through the wedgelike contact elements 22. The connecting struts have reinforcements 20 at defined points, which have greater mechanical resistance to deformation forces. In the later calking of the return ring packet 42 to the toothed rim packet 35, these reinforcements serve to deflect the wedgelike contact elements 22, with their contact faces 30, in a defined way toward the corresponding contact faces 30' of the toothed rim packet 35.

Figure 4:
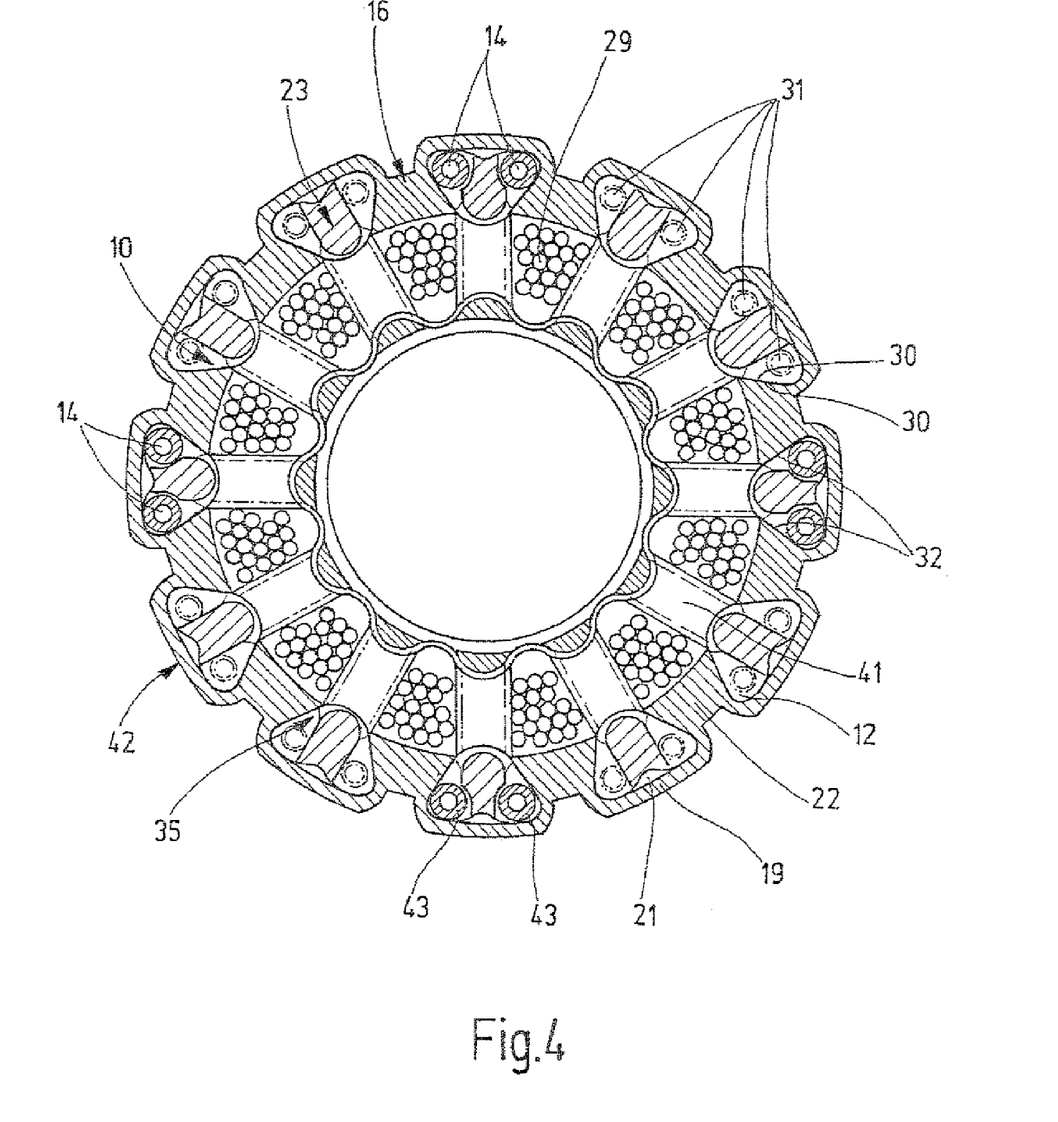
FIG. 4, is an end view of a wound toothed rim packet after being joined to a return ring.

FIG. 4 shows a top or end view of a wound toothed rim packet 35 in the state in which it has been joined to a return ring 16; the toothed rim 10 and the return ring 16 are embodied as engaging one another in the radial direction.

For making a connection between the tooth tips 12 of the gear rim 10 and the return ring 16, a connecting means is provided, which is embodied as corresponding contact faces 30 of wedgelike contact elements 22 of the return ring 16 and contact faces 30' of the wedgelike tooth tips 12. The wedgelike contact elements 22, embodied as adapters, of the return ring 16 have contact faces 30 that correspond precisely with contact faces 30' of the tooth tips 12. The tooth tips 12 moreover fit precisely into recesses 21 that are formed by the connecting struts 19 of the return ring 16.

The joining of the toothed rim packet 35 with a return ring packet 42 that includes return rings 16 is done as follows: After the toothed rim packet 35, provided with two top pieces (winding heads) 23, 23', has been wound with a winding assembly 29, the return ring packet 42 is thrust over the toothed rim packet 35. This is possible without the expenditure of force since there is a small gap 32 a few tenths of a millimeter wide between the two packets 35, 42.

Figure 5:
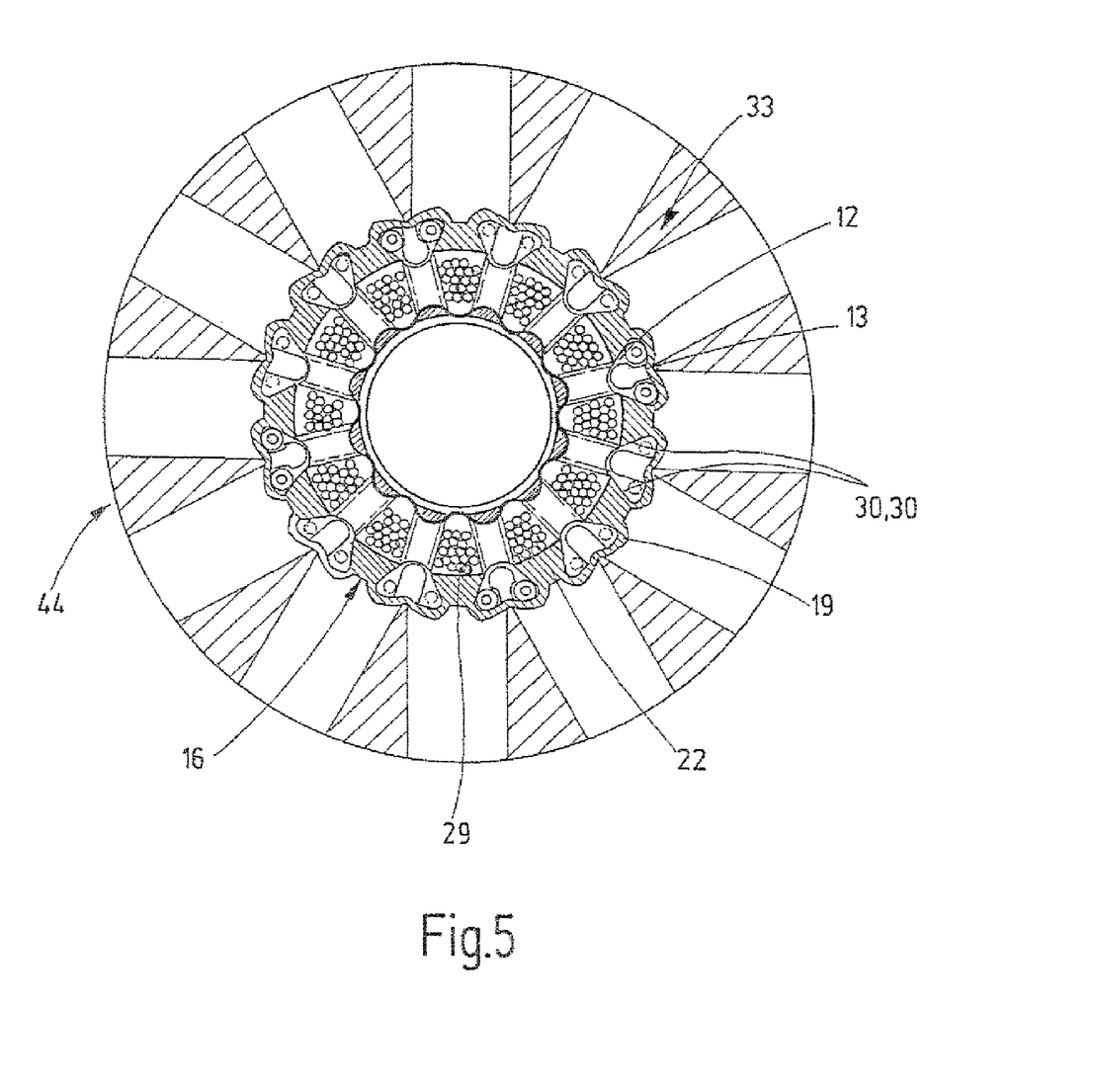
FIG. 5, an illustration of a wound toothed rim packet with a calked return ring, together with a calking tool.

FIG. 5 shows how the two packets 35, 42 are calked after being positioned. The construction of the individual elements in FIG. 5 corresponds to that in FIG. 4. In the calking, the thin-walled regions of the connecting struts 19 of the return ring 16 are pressed into the outer indentations 13 in the tooth tips 12, and as a result the wedgelike contact elements 22 are pulled into engagement against the corresponding contact faces 30' of the tooth tips 12. The wedgelike contact elements 22 of the return ring 16 that are located between the connecting struts 19 are pulled radially outward along corresponding contact faces 30 of the tooth tips 12, being guided by the reinforcements 20, which bend only slightly, on the connecting struts 19. Preferably, wedges of a tool 44 are used in the calking and simultaneously calk the return ring 16 to the gear rim 10 radially in the directions 33. During the calking, teeth disposed on the rotor can be secured—if necessary—by a bracing means, not shown, such as a mandrel.

Figure 6:
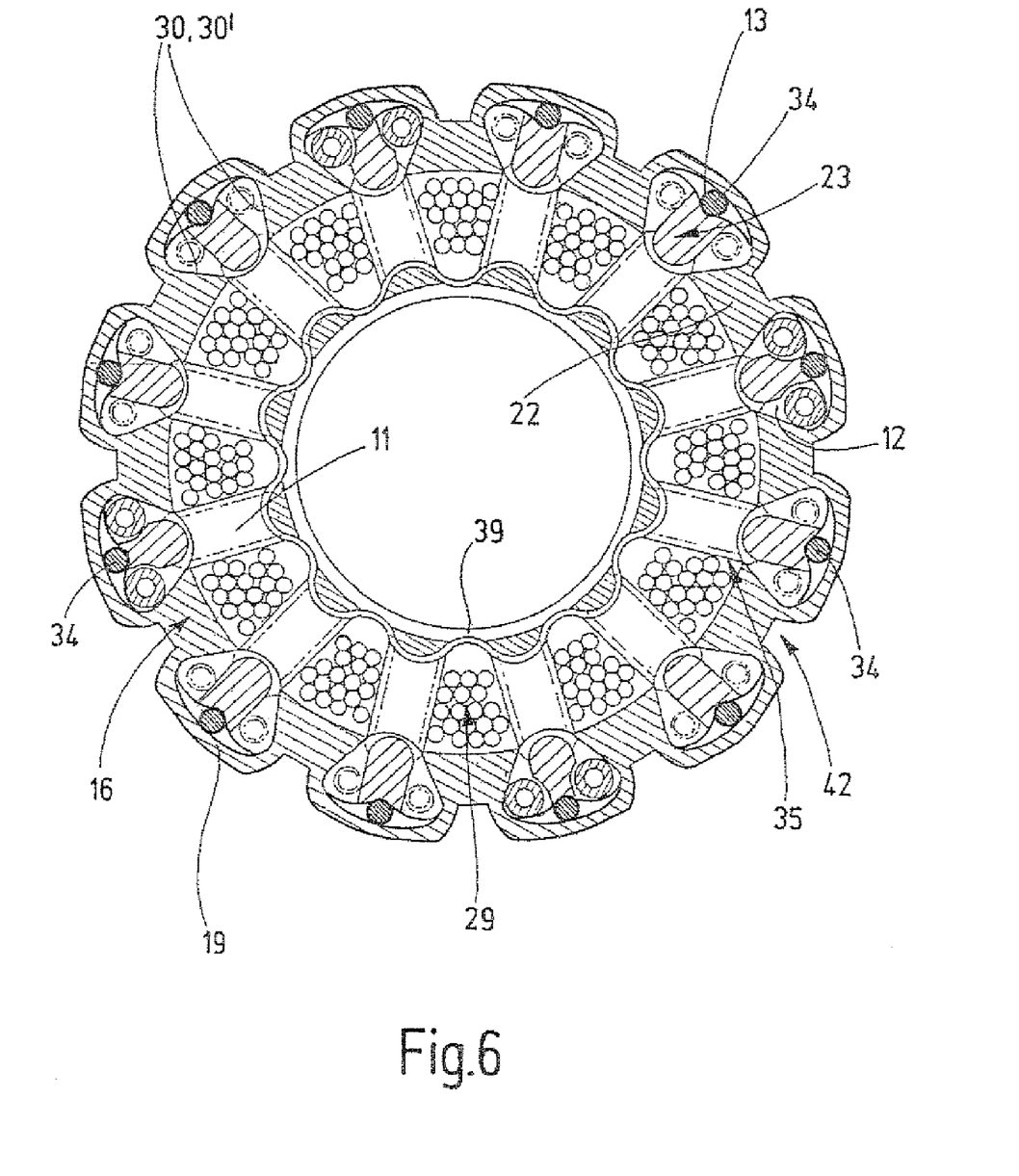
FIG. 6, a view of a wound toothed rim packet, with a wedge return ring.

In FIG. 6, an alternative embodiment of the invention is shown, in which the connection is produced in the form of wedging between the gear rim packet 35 and the return ring packet 42 by means of expanding means embodied as pins 34. The pins 34 are each disposed in the outer indentation 13 of the tooth tips 12.

The construction of a toothed rim packet 35, which is joined to the return ring packet 42 and connected on both ends to a top piece 23, is essentially equivalent to the construction of the corresponding elements in FIG. 4. In the wedging, the pins 34, disposed between the connecting struts 19 of the return ring 16, are press-fitted into the outer indentations 13 in the tooth tips 12. As a result, the wedgelike contact elements 22 of the return ring 16 are pulled against corresponding contact faces 30 of the tooth tips 12, and the deformable, thin-walled regions of the connecting struts 19 of the return ring 16 are pressed outward and deformed. Since the connecting struts 19 are braced on an outside of the tooth tips 12 by way of the press-fitted pins 34, no mechanical stresses in the struts 39, toward the rotor, of the teeth 11 are created in the pressing operation. The struts 39 after the joining can therefore easily be mechanically or electrochemically separated, which contributes to improving the course of magnetic flux.

Figure 7:
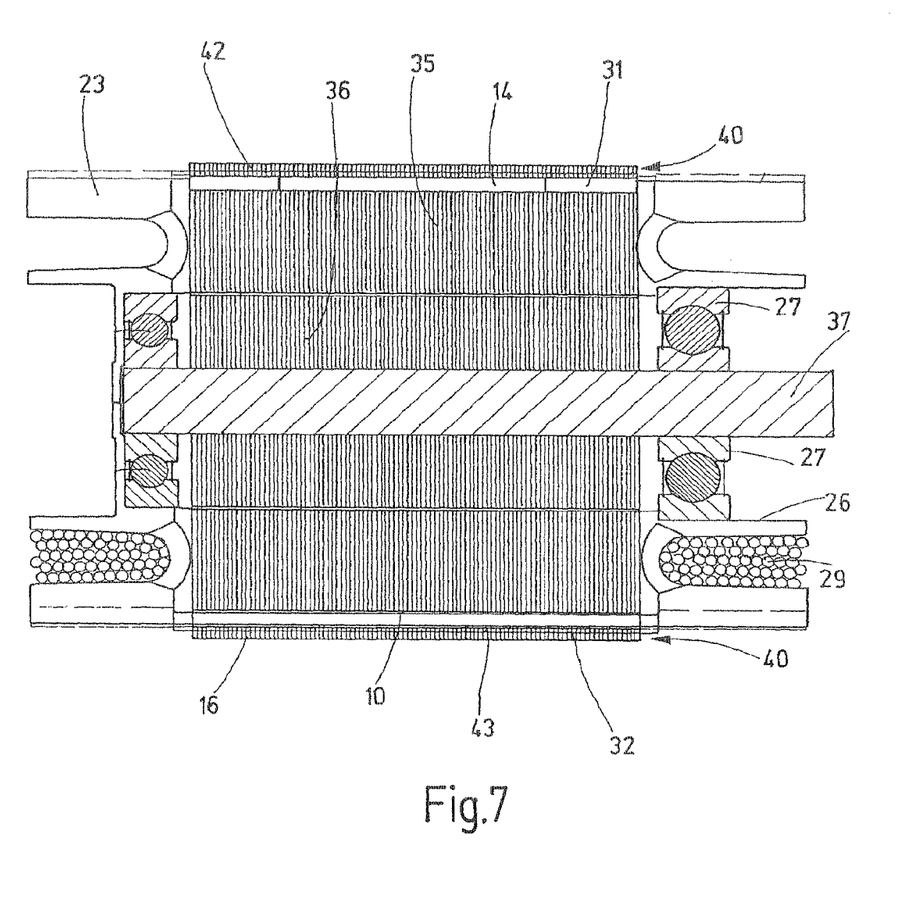
FIG. 7, a section through an embodiment according to the invention of a DC machine.

In FIG. 7, a section is shown through a DC machine of the invention, with a rotor packet 36 and a toothed rim packet 35 that includes the rotor packet 36. The toothed rim packet 35 is formed of stamped toothed rim s 10 and is fixed on its axial free ends by top pieces 23, 23'. For fixation and adjustment of the top pieces 23, 23' in the toothed rim packet 35, the top pieces 23, 23' have pegs 31, which are pressed into stamped holes 14 in the tooth tips 12 of the toothed rim packet 35. The top pieces 23, 23' each have one receiving opening 26 for receiving a rotor bearing 27, in which a shaft 37 is disposed. Simultaneously, the top pieces 23, 23' serve to guide and receive the winding assembly 29. The toothed rim packet 35 is wound after the top pieces 23, 23' have been assembled. The top pieces 23, 23' separate the toothed rim packet 35 from the winding assembly 29. After the winding is done, the top pieces 23, 23' are additionally held on the stator by the winding assembly 29.

After the gear rim packet 35 has been wound, a return ring packet 42, formed of return rings 16, is thrust over the gear rim packet 35 in a joining direction 40. This can be done without expending force, since between the two packets 35, 42, there is a gap 32 whose size is on the order of magnitude of a few tenths of a millimeter. After the joining, the gear rim packet 35 and the return ring packet 42 are calked or wedged into engagement, as described above in detail.

Before the joining, the toothed rim packet 35 and the return ring packet 42 may be provided with an electrical insulation layer, such as a paint layer, as a result of which, upon calking or wedging, a mechanically firm and electrically nonconductive connection is made between the tooth tips 12 of the toothed rim packet 35 and the return ring packet 42.

The foregoing relates to a preferred exemplary embodiment of the invention, it being understood that other variants and embodiments thereof are possible within the spirit and scope of the invention, the latter being defined by the appended claims.

The invention claimed is:

1. In a brushless DC machine, having a stator that holds a winding assembly and having a rotor, the stator including a toothed rim with radially outward-extending tooth tips, and a return ring, the improvement wherein the toothed rim and the return ring mesh with one another with a small gap in the radial direction, and wherein connecting means are capable of converting the small gap into a tight connection between the tooth tips of the toothed rim and the return ring.

2. The DC machine as defined by claim 1, wherein the toothed rim and the return ring are dimensioned to be joined one inside the other without force before the tight connection is made.

3. The DC machine as defined by claim 1, wherein the return ring comprises connecting struts that correspond to the tooth tips of the toothed rim.

4. The DC machine as defined by claim 3, wherein the connecting struts are press-fitted at least in some regions into outer indentations in the tooth tips so as to convert the small gap to the tight connection.

5. The DC machine as defined by claim 4, further comprising pins which are each disposed in at least some regions between the outer indentations of the tooth tips and the connecting struts so as to deform the struts outwardly and thus convert the small gap to the tight connection.

6. The DC machine as defined by claim 1, wherein the stator comprises one top piece on each of its free ends, which end pieces are inserted with pegs into the toothed rim and have wire guides on the outside.

7. The DC machine as defined by claim 1, wherein the return ring comprises an annular body having radially inward-pointing contact elements that widen in wedgelike fashion toward the inside, the contact elements forming undercuts.

8. The DC machine as defined by claim 7, further comprising connecting struts connecting the contact elements, the connecting struts at least in some regions being thin-walled.

9. The DC machine as defined by claim 8, wherein the connecting struts include reinforced portions, which, upon a deformation in the connecting struts, for making the tight connection, the reinforced portions deform less that the rest of the struts.

10. The DC machine as defined by claim 1, wherein the toothed rim comprises outward-pointing teeth and radially extending wedgelike tooth tips that form undercuts.

11. The DC machine as defined by claim 1, further comprising a top piece comprising a receiving opening for receiving a rotor bearing.

12. The DC machine as defined by claim 11, wherein the top piece further comprises an outward-pointing face-end wire guide for a winding assembly.

13. The DC machine as defined by claim 11, wherein the top piece further comprises pegs extending axially from the receiving opening for fixation in a stator of the DC machine.

14. A method for producing a brushless DC machine having a stator that holds a winding assembly and having a rotor, the stator being constructed of stamped laminations and comprising a toothed rim with radially extending tooth tips and a return ring, the method comprising caulking corresponding contact faces on the stator and the return ring to one another by providing thin-walled connecting struts between adjacent contact faces of the return ring, and deforming the connecting struts such that wedgelike contact elements of the return ring that are located between the connecting struts are pulled against corresponding contact faces of the tooth tips.

15. The method as defined by claim 14, further comprising press fitting connecting means embodied as pins in at least some regions between the connecting struts of the return ring and the tooth tips.

16. The method as defined by claim 14, wherein the connecting struts of the return ring are press-fitted at least in some regions into outer indentations of the tooth tips.

17. The method as defined by claim 15, wherein the connecting struts of the return ring are press-fitted at least in some regions into outer indentations of the tooth tips.

18. The method as defined by claim 14, wherein the toothed rim and the return ring are provided with an electrical insulation layer.

19. In a brushless DC machine, having a stator that holds a winding assembly and having a rotor, the stator including a toothed rim with radially outward-extending tooth tips, and a return ring, the improvement wherein the toothed rim and the return ring mesh with one another, and wherein the toothed rim has a plurality of teeth (11), each of which extends away from the center of the toothed rim in the radial direction, and each of which has an outer surface on its outer end and an indentation in the middle of the outer surface defining a small gap between the indentation (13) and the return ring, and a connection means (34) for connecting the toothed rim and the return ring.

\* \* \* \* \*